United States Patent [19]

Murata et al.

[11] Patent Number: 4,674,228
[45] Date of Patent: Jun. 23, 1987

[54] PROCESS OF SHIITAKE (*LENTINUS EDODES*) CULTIVATION

[75] Inventors: Hideo Murata, Kyoto; Masaaki Yamauchi, Osaka; Hajime Tanaka, Kyoto, all of Japan

[73] Assignee: Kanebo Foods, Ltd., Tokyo, Japan

[21] Appl. No.: 779,517

[22] Filed: Sep. 24, 1985

[51] Int. Cl.⁴ ............................................. A01G 1/04
[52] U.S. Cl. ..................................................... 47/1.1
[58] Field of Search .......................................... 47/1.1

[56] References Cited

U.S. PATENT DOCUMENTS

| | | | |
|---|---|---|---|
| 4,071,973 | 2/1978 | Iizuka et al. | 47/1.1 |
| 4,083,144 | 4/1978 | Fuzisawa et al. | 47/1.1 |
| 4,083,145 | 4/1978 | Fuzisawa et al. | 47/1.1 |
| 4,127,965 | 12/1978 | Mee | 47/1.1 |
| 4,161,083 | 7/1979 | Fuzisawa et al. | 47/1.1 |

FOREIGN PATENT DOCUMENTS

| | | | |
|---|---|---|---|
| 48-35223 | 10/1973 | Japan | 47/1.1 |
| 49-34508 | 9/1974 | Japan | 47/1.1 |
| 112156 | 9/1978 | Japan | 47/1.1 |
| 58-56614 | 4/1983 | Japan | 47/1.1 |
| 85/00002 | 1/1985 | World Int. Prop. O. | 47/1.1 |

*Primary Examiner*—James R. Feyrer
*Attorney, Agent, or Firm*—Austin R. Miller

[57] ABSTRACT

A process for preparing artificial bed blocks for "Shiitake" mushroom cultivation, comprising culturing lumps of spawn (mycelia) in a bottle or other containers, taking out the grown-up mycelia from the container to be kept in a closed space, keeping culturing while raising humidity in the space close to saturation to form a new aerial hypha layer on the whole surface of the lumps of spawn for higher resistance to weed fungi, then sprinkling with water over the lumps in open space to prevent weed fungi from depositing.

8 Claims, 3 Drawing Figures

PROCESS OF SHIITAKE (LENTINUS EDODES) CULTIVATION

BACKGROUND OF THE INVENTION

This invention relates to a process of preparing artificial bed blocks for "Shiitake" mushroom by using lumps of spawn cultured in a container.

Generally, "Shiitake" mushroom is cultivated by using bed logs, covering the bed logs with sheets to prevent bed logs from drying, promoting growth of the mycelia under the conditions conducive to growing the mycelia and to prepare bed logs, then laying out the bed logs at an appropriate place to permit continued growth of the mycelia and the growth of "Shiitake" fruit bodies.

According to the conventional of method mentioned above, bed logs are used. However, a decrease in number of the broad-leaf trees has reduced the availability of bed logs. Thus, it makes the conventional bed log cultivation method less desirable.

Moreover, the longer cultivation period is required and a shorter period for cultivation is desired.

Another problem is the troublesome work required for such an agricultural producing method.

Intending to solve these problems, attempts to prepare artificial bed culture consisting of sawdust, rice bran or the like and have been made to cultivate "Shiitake" mushroom on such bed culture medium.

Unlike *Pleurotus ostreatus, Pholiota nameko, Flammulina velutipes* and other kinds of mushrooms successfully cultivated by an artificial method using bed culture medium with sawdust, rice bran, "Shiitake" is difficult to cultivate on an artificial bed culture medium and no technique for industrial level has been established so far.

One cultivation method using an artificial bed block comprises filling a bottle with sawdust, rice bran etc., inoculating, plugging the bottle to incubate in pure culture and for growing white and soft lumps of mycelium, take out the grown-up lumps of mycelium from the bottle to be sealed in a polyethylene bag and left for about a week, lumps of mycelium become an artificial bed blocks, the surface layer of the lumps of spawns turning into a brown colored hard bark layer, then removing the bed blocks from the bag to apply cooling stimulation such as immersion into cool water for appearance of mushrooms.

This method reduces contamination by various weed fungi. However, it has the disadvantage of resulting in an unstable appearance of fruit bodies of mushrooms as well as a smaller quantity. They are of poor quality, e.g. having a bad shape.

Another method is the one disclosed in the Japanese Patent Publication No. 56-99726, where a container is filled with culture medium primarily made of sawdust, the culture medium is inoculated, the culture medium shaped into a lump is taken out of the container to cut the inoculated side, a number of culture media are joined by sections, which are left for about 10 days at a temperature from 15° to 20° C. while sprinkling with water to grow the mycelium, said culture media are unified by the said grown mycelium, then sprinkling with water is kept for about from two and a half months to three months to prepare matured artificial bed blocks for "Shiitake" cultivation.

This method provides large sized artificial bed blocks which are easy to handle but this method also has the disadvantages associated with inferior artificial bed blocks namely the artificial bed blocks break partly and putrefy. It is not efficient to prepare bed blocks by this method.

A third method is Iizuka et al disclosed in the U.S. Pat. No. 4,071,973. In this method, the steps of growing hyphae and producing lumps of spawn are not characteristic, but the rate of appearing fruit bodies of *Lentinus edodes* is raised by subjecting grown-up lumps of spawn to a high and low temperature treatments alternately, and during the treatments by illuminating the surface of the lumps of spawn at definite luminous intensity. However, this method of Iizuka et al has the drawback in that the lumps of spawn are not sprinkled with water and the lumps of spawn are made susceptible to contamination by weed fungi.

A fourth method is the one which disclosed in U.S. Pat. No. 4,083,144, where a bed of culture medium is put into an air-permeable bag, inoculated with fungus seed and cultivated to give high efficiency cultivation of *Lentinus edodes* because of appropriate ambient air. However, this method also has the disadvantage of not sprinkling the lumps of spawn with water. Thus, the lumps of spawn are more susceptible to contamination by weed fungi.

Another method is disclosed in U.S. Pat. No. 4,083,145. This is a method for vessel cultivation of *Lentinus edodes* in a bed of culture medium contained in an open-topped vessel which comprises forming a plurality of open-topped seed-inoculating and air-supplying holes in the side face of the bed of culture medium and extending along the inner wall of the vessel, sterilizing said bed, then inoculating fungus seed of *Lentinus edodes* in the holes of the sterilized bed of said culture medium, cultivating said bed to generate hyphae of *Lentinus edodes* in the culture medium, then taking the bed, as a unit, out of the vessel, then subjecting the bed to mushroom-growing conditions effective to form fruit bodies of *Lentinus edodes* which grow from the side faces of the culture medium. This method has also the same drawbacks as the other methods mentioned-above that the lumps of spawn are more susceptible to contamination by weed fungi because they are not sprinkled with water.

The problems associated with the conventional methods of preparing artificial bed blocks for "Shiitake" cultivation prompted, the inventors to develop a method for preparing artificial bed blocks for "Shiitake" cultivation of whereby there is a stable appearance of fruit bodies and high resistance to weed fungi. Furthermore, this method also has the advantages of the cultivation method using artificial bed blocks resulting in a shorter cultivation period than is permitted by conventional bed log methods and also enables industrial production.

The inventors prepared lumps of mycelium according to the following process to find out why conventional methods using an artificial bed block result in no fruit bodies growing or a small number of fruit bodies grow and those which do grow are deformed unstable.

A culture medium, consisting of sawdust, rice-bran, and wheat-bran is filled into a polypropylene bottle or bag to be steamed for sterilization, inoculated, kept for one or two months at the optimum temperature (20°-26° C.) for *L. edodes* culturing, then the grown-up lumps of mycelium are taken out after allowing the mycelia to grow up into the cultured medium. The lumps of mycelium are removed by conventional methods using an artificial bed blocks, namely, pushing them out from polypropylene bottles or by cutting open polypropylene bags.

The lumps of mycelium at this stage are very soft, however, the hyphae are damaged when taken out in this manner. The damaged lumps of mycelium are kept cultivated for comparison with non-damaged lumps of mycelium and it was found that the damaged hyphae are less resistant to weed fungi and are less susceptible to bacterial contamination. Thus the damage caused by removing the fruit bodies causes deformed fruit bodies of mushroom having low resistivity to weed fungi. Accordingly, it was studied to develop a new removal method so that the lumps of mycelium could be removed without causing damage. During the study, it was noted that healing of damaged lumps of mycelium removed according to the conventional method is more desirable for industrial production of artificial bed blocks than to develop a method to avoid causing damage. Thus, attention was directed toward the method of healing.

The first step in the healing method was to keep the removed lumps of mycelium in a closed space having a, high humidity, i.e. humidity raised saturation or close to saturation for culturing. This allows a new aerial hypha layer to form on the whole surface of the lumps of spawn.

As the next process the second step in the healing method requires sprinkling water, water over the lumps of mycelium in open air, to achieve optimum moistening of L. edodes. The danger of weed fungi contamination was reduced by the aerial hypha layer formed during the first step which increased the resistance of the mycelium lumps to weed fungi. The result of this study gave rise to the instant invention. The study showed that the first step of the healing method lead to a new formation of aerial hypha on the lumps of spawn. The new hypha layer imparted to the spawn an increased resistance to weed fungi. The second step of the healing process allows weed fungi found on the new hypha layer to be washed off of the new aerial hypha layer surface and it also increases the activity of the spawn to produce more stable appearance of fruit body of mushroom having increased resistance to weed fungi. Consequently, the present invention was reached.

BRIEF SUMMARY OF THE INVENTION

It is a general object of the present invention to form a new aerial hypha layer over the surface of the lumps of mycelium taken out of a container, to heal the damage of the lumps of mycelium given when they are taken out, and concomitantly to increase resistance to weed fungi.

Another object of the present invention is to wash off the weed fungi staying on the aerial hypha layer over the lumps of spawn and also to increase activeness of the spawn to obtain favourable artificial bed blocks efficiently.

Other features and advantages of the present invention will appear from the description given below referring to the attached drawings.

DETAILED DESCRIPTION OF THE INVENTION

According to the present invention, bed culture medium consisting of sawdust, rice-bran and wheat-bran is filled into polypropylene bottles or bags or other container to be sterilized by steaming.

After inoculation, the culture medium is kept at the optimum temperature for incubating (20° to 26° C.) for a month or two, then taken out of the container after allowing the mycelium to grow up into the whole culture medium. The white and soft lumps of mycelium are removed from the container and are kept in a closed space (nearly closed or completely closed space).

Figure 1:
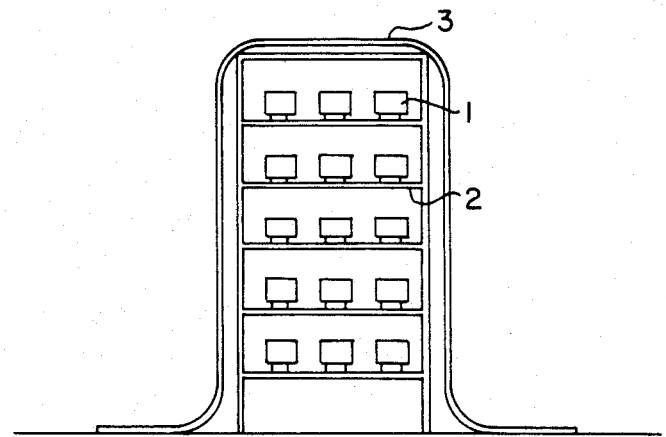
FIG. 1 is an explanatory drawing of an embodiment of the present invention showing the culture process of the lumps of mycelium taken out of a bottle in a closed space.

The removal method entails putting the lumps of mycelium into a closed space, whereby the removed lumps of mycelium are (1) taken out of are placed side by side with a specified spacing on a net rack (2) as shown in FIG. 1, then the whole lumps are covered with a vinly sheet (3).

Activation of the lumps of mycelium is achieved in the enclosed space by providing a sufficient amount of oxygen and water. Thus, the humidity is kept well over 90% to ensure the presence of excessive moisture. Cultivation is continued under this condition to form a new cotton-like fluffy layer of aerial hypha on the surface of white and soft lumps of mycelium (1). Thus, any deformation caused by removing the lumps of mycelium from the container are corrected by the formation of the new aerial hypha layer, and external lacerations, or defects are healed. At the same time, the resistance to weed fungi is increased, and moisture is evenly distributed to a number of lumps of mycelium placed side by side, and moisture content in each lump is stabilized.

This is the primary feature of the present invention. By the culture process, resistance of the lumps of mycelium against weed fungi is increased greatly because of the aerial hypha layers formed newly on the whole surface of the lumps and putrefaction due to weed fungi in later processes is suppressed significantly.

When the closed space is formed with sheetings such as a vinyl sheet (3) as described above, it is desirable to set the volume of the closed space 2 to 10 times as large as the total volume of the lumps of mycelium (1).

If the volume of the closed space is less than two times of the volume of the lumps of mycelium (1), the lumps placed side by side in the closed space tend to stick each other. Once they stick each other, the lumps easily crumbles when they are pulled apart.

If the volume of the closed space is over 10 times of the volume of the lumps of mycelium (1) on the other hand, the space is wasting due to leaving too much space, the absolute quantity of the water secreted from the lumps of spawn (1) runs short, which reduce a humidity in the closed space to less than 90%, surface of the lumps of mycelium (1) is dried, and the activity of mycelium tends to become weak.

It is, therefore, preferable, to set the volume of the closed space made by using a sheeting at 2 to 10 times of the total volume of the lumps (1).

For culturing the lumps of spawns (1) in this kind of enclosed space, it is desirable to set at temperature between 15° and 28° C. When the temperature falls to lower than 15° C., it takes longer time for spawn layer forming and it rises higher than 28° C., the activity of mycelium becomes weak. Setting at temperature between 15° and 28° C. is therefore preferred.

If the moisture content of the lumps of mycelium (1) placed side by side in a closed space as described above is lower than 50%, the humidity in the closed space can hardly be increased to the specified degree. It is, therefore, advisable to put watered pads in the closed space to raise humidity in the space up to the specified degree by the moisture evaporated from the pads.

The appropriate moisture content for *L. edodes* is about 60% and by keeping the lumps of "mycelium" in a closed space as described above, "*L. edodes*" themselves are kept equilibrium at the appropriate moisture degree (50 to 70%) to demonstrate an appropriate activity. When the lumps of spawns (1) are cultured in a space as described above, it is preferable to set the culturing time at 3 to 10 days.

Culturing time of less than 3 days does not allow aerial hypha layer to form and does not allow even distribution of moisture. Culturing time exceeding days, on the other hand, is not necessary because the maximum benefits are achieved within 3-10 days.

When the temperature in the closed space is set between 20° and 28° C., for instance, culturing time of 3 to 5 days is good enough. At a temperature below 20° C., however, 5 to 10 days are required.

Figure 2:
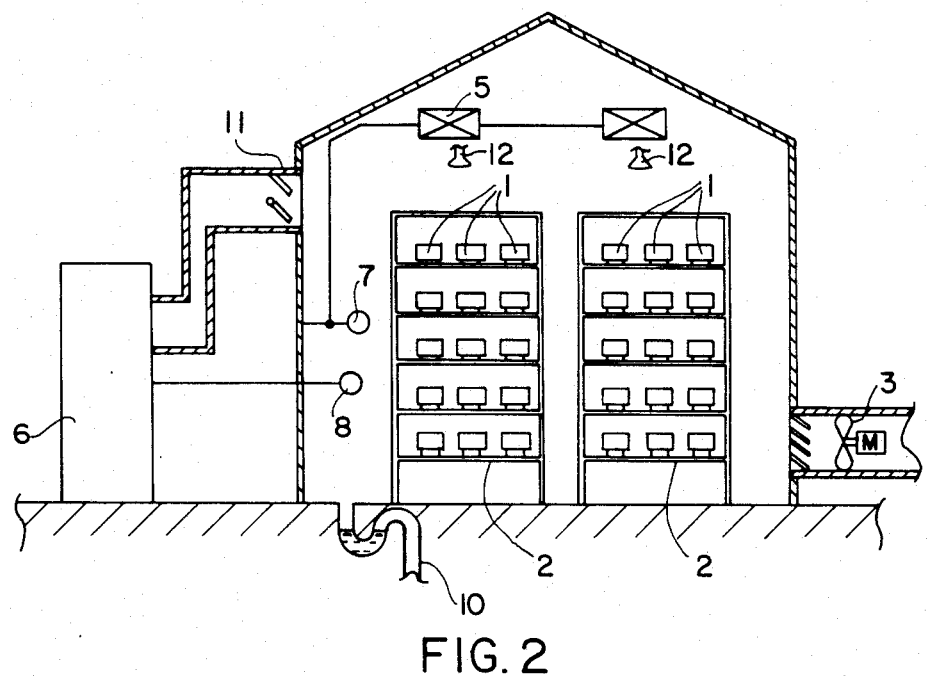
FIG. 2 is another drawing to show still other culture process of the lumps of mycelium taken out of a bottle in a closed space.

Instead of forming the enclosed space by covering the rack (2) with the lumps of mycelium (1) placed side by side with a vinyl sheet (3) as described above, it is also possible to form the space by a closed house with a ventilator at the top provided with a humidifier (5), air conditioner (6), humidity sensor (7), temperature sensor (8), exhaust fan (9) and a floor drain channel (10) as shown in FIG. 2.

This closed house is advantageous in that the inside can be controlled to the optimum temperature and humidity conditions for growth of mycelium at all time by operating the humidity sensor (7), temperature sensor (8), humidifier (5) and the air-conditioner (6) to keep stable atmospheric condition.

With this kind of closed house, therefore, there is no need to adjust volume of the space to 2 to 10 times of the total volume of the lumps of mycelium (1) as it is necessary for the closed space made by a sheeting and the object can be attained by setting the optimum temperature and humidity condition and by keeping culturing for 3 to 10 days under the condition. In FIG. 2, (11) is a chamber. The exhaust fan (9) is to discharge internal air quickly to the outside together with the air-conditioner (6) when inside of the house reaches the dewpoint and it dews in result, and the floor drain channel (10) is to discharge water produced by dewing.

Figure 3:
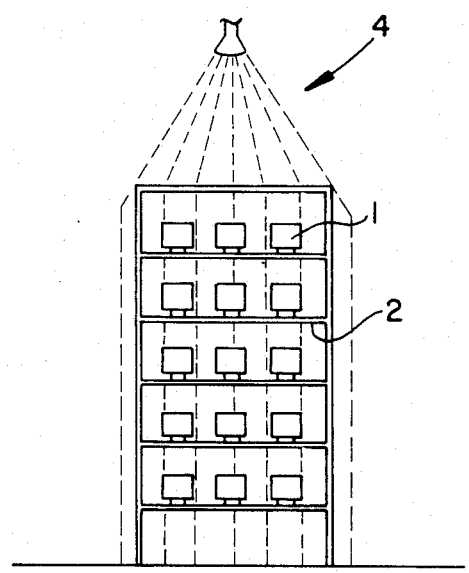
FIG. 3 is to illustrate watering over the lumps of mycelium cultured in the closed space shown in FIG. 1 and FIG. 2 in an open space.

The lumps of spawn cultured in a closed space as described above are then taken out of the closed space to be watered in an open space. The closed space is opened by removing the vinyl sheet (3) of FIG. 1 or by opening a ventilator of FIG. 2 (not shown), and water is sprinkled evenly onto the lumps of mycelium (1) with a water sprinkling device (4) (FIG. 3) such as a sprinkler or with a spray nozzle (12) (FIG. 2) from above the rack (2).

Sprinkling with water cleans the surface of lumps of mycelium and prevents deposition of spores of weed fungi come flying onto the lumps of spawns (1) besides the new hypha layer formed in the precedent process on the lumps of mycelium. The lumps of mycelium (1) made damaged by removal are healed by culturing in the closed space and moisture distribution in the lumps of mycelium is also optimized, so it is hard for sprinkled water to penetrate into lumps of mycelium.

The new hypha layer formed on the surface, the lumps of mycelium (1) is not damaged by the drops of sprinkling water. It is preferable to keep spraying for more than 7 days so that the temperature of the lumps of mycelium is kept at 15° to 28° C., more preferable at 20° to 25° C.

It may possible to keep the above temperature range by controlling the ambient temperature or by setting temperature of the water used for sprinkling within the said temperature range.

By sprinkling for 7 days or more ordinarily, the surface of lumps of mycelium (1) turn brown and lignified activity of the mycelium raises and resistance to weed fungi increases.

By this water sprinkling, the lumps of mycelium (1) are turned into artificial bed blocks for "Shiitake" mushroom cultivation.

When sprinkling water less than 7 days, it may possibly cause re-contamination by weed fungi at later process when fruit bodies of mushroom appear. It is necessary to sprinkle water for more than 7 days, preferably over 20 days.

The water sprinkling may be continued for 24 hours or may be intermitted every 8 hours.

It may also possible to divide sprinkling into two steps, i.e.; to spray comparatively a large quantity of water in the first step to keep the lumps of mycelium wet at all times and to reduce the quantity of water or to sprinkle intermittently in the later half so that equilibrium moisture is kept in the lumps of mycelium.

To obtain better result, antimicrobial substances, bacteriostatic substances, hydrogen ion concentration controlling substance, or nutritious substance to "*L. edodes*" may be dissolved into the water used for sprinkling independently or in combination as required. Dissolution of antimicrobial or hydrogen ion concentration controlling substance effectively prevents the evil influence by weed fungi contamination and serves for efficient preparation of favourable bed blocks resistive to weed fungi, and addition of nutritious substance to "*L. edode*" promotes growth of the mycelium for efficient preparation of bed blocks with well grown mycelium.

It is more effective to use the substances in combination than to use independently and combined use is more practical.

As the antimicrobial substances, any substance can be used if it does not bother growth of "*L. edodes*" and has antimicrobial effect, and those having resistive effect to bacterial are suitable in particular. For example, sodium hypochlorite, bleaching powder, sorbic acid, sugar ester, thiabendazole, propylene glycol, propionic acid, streptomycin, dicyanon, and benomyl are used independently or in combination of two or more kinds.

It is desirable to dissolve such substances in water to a concentration of thinner than their normal use, then to add the solution to the water used for sprinkling.

Water containing such solution may be used at all times for sprinkling or used alternatively with water containing no such solution.

As the control substance of hydrogen ion concentration, non-organic acids, organic acids and their salts are used, such as hydrochloric acid, citric acid, fumaric acid, lactic acid, acetic acid, humic acid, phosphate, sulfate, nitrate and potassium salt.

The appropriate pH range is 2.5 to 7 or preferably from 4 to 5.

The nutritious substances to "*L. edodes*" include monosaccharide, oligosaccharide, salts including different kinds of elements, vitamin, and mineral.

The artificial bed blocks for "Shiitake" mushroom cultivation can be used for fruit body of mushroom appearing in the same manner as for the bed logs made of trees after sprinkling or soaking in water or by other known methods of cooling stimulation.

According to the present invention, all the disadvantages of the artificial bed blocks by conventional method are overcome and artificial cultivation of "Shiitake" mushroom can be industrialized. Since "Shiitake" cultivation with artificial bed blocks can grow *L. edodes* much faster and at higher yield ratio than by the cultivation with the bed logs made of tree, stable supply of "Shiitake" mushroom can be realized. Moreover, the cultivation is not affected by the shortage of deciduous trees for which conventional bed log cultivation methods require.

The present invention is described further referring now to some embodiments.

EMBODIMENT 1

Sawdust, rice-bran, and wheat-bran are mixed in the ratio of 8:1:1, then water is added to the mixture to prepare culture medium, which is filled into a container of 1 kg capacity made of polypropylene, and the container is covered with a cap having a filter. The culture medium is subjected to pressurized high temperature sterilization at 121° C. for 90 minutes, inoculated, then is cultured at 25° C. After culturing for 2 months on this condition and making sure that the spawns are grown up filling up in the container, the lumps of mycelium are taken out of the container. The lumps taken out in this manner are placed on a rack side by side and the whole rack is covered with a vinyl sheet as shown in FIG. 1, then is cultured for 5 days at 20° to 25° C.

Table 1 shows the average moisture (X) and the standard deviation (S) of the lumps of mycelium after culturing (group 1 to 3 of 30 samples each) in comparison with the average moisture and the standard deviation of the lumps before culturing.

TABLE 1

|  | 1 | 2 | 3 |
| --- | --- | --- | --- |
| When taken out of a container | X = 74.6% S = 10.6 | X = 69.2% S = 8.3 | X = 62.1% S = 6.9 |
| At the end of culturing process | X = 68.3% S = 4.9 | X = 66.3% S = 3.1 | X = 61.5% S = 3.4 |

As Table 1 indicates, the lumps of mycelium of each group come close to the optimum moisture for growth of "mycelium", 60±10% at the end of the culturing for 5 days by convering the whole rack with a vinyl sheet and the standard deviation becomes smaller and the moisture becomes even.

To the lumps of mycelium after culturing by covering the whole rack with a vinyl sheet as stated above, city water is sprinkled with sprinklers for 10 days after removing the vinyl sheet. The sprinkling is made in succession and the temperature is set at 20° to 25° C. for preparation of the artificial bed blocks for "Shiitake" cultivation.

EMBODIMENT 2

The culturing time with a sheet covering the whole rack is shortened to two days and the culturing temperature is set at 15° to 22° C., and the artificial bed blocks for "Shiitake" cultivation are prepared with all the other conditions kept unchanged from those of embodiment 1.

EMBODIMENT 3

The sprinkling time after culturing with a vinyl sheet covering the whole rack and after removing the vinyl sheet is changed to intermittent sprinkling with water for 8 hours, and the artificial bed blocks for "Shiitake" cultivation are prepared with all the other conditions kept unchanged from those of embodiment 1.

EMBODIMENT 4

Solution of Merckdelan (made by Dainihon Jochugiku, Japan) is diluted by 5000 times in a tank for sprinkling water and is sprayed for 6 hours a day and city water is sprinkled for the remaining 18 hours. Artificial bed blocks for "Shiitake" cultivation are prepared while keeping all the other conditions unchanged as those of embodiment 1.

EMBODIMENT 5

As the water for sprinkling, fumaric acid is added to city water to pH 4.5±0.5 and artificial bed blocks for "Shiitake" cultivation are prepared while keeping all the other conditions unchanged as those of embodiment 1.

EMBODIMENT 6

Mixture of $K_2HPO_4$, $NH_4NO_3$ and $KNO_4$ in equal quantity with equal quantity of molasses is prepared to 0.01% concentration with city water then is sprinkled for 6 hours a day, and city water is sprinkled for the remaining 18 hours. Artificial bed blocks for "Shiitake" cultivation are prepared while keeping all the other conditions unchanged as those of embodiment 1.

EMBODIMENT 7

Bleaching powder is dissolved into city water to 10 PPM by available chlorine, 0.01% of blackstrap molasses is added to the solution, pH is adjusted to 4 to 5 with sodium polyphosphate and lactic acid, then the solution is sprinkled for 6 hours a day, and city water is sprinkled for the remaining 18 hours. Artificial bed blocks for "Shiitake" cultivation is prepared by keeping all the other conditions unchanged from those of embodiment 1.

EXAMPLE FOR COMPARISON 1

Lumps of mycelium are taken out of the container then water is sprinkled over the lumps (under the same conditions for sprinkling with water as embodiment 1).

EXAMPLE FOR COMPARISION 2

Lumps of mycelium are taken out of the container, sealed into a polypropylene bag, then subjected to culturing for 7 days at 20° to 25° C. No water sprinkled after culturing in this case.

Table 2 shows the culturing time, culturing conditions, and condition of lumps of mycelium in the above embodiments and examples for comparison and also shows the rate of contamination by weed fungi of the artificial bed blocks for "Shiitake" cultivation as well as the yield ratio of fruit body of mushroom. The yield ratio of fruit body of mushroom is given from the yield of "Shiitake" harvested in three months by cultivation on artificial bed blocks under the temperature condition of 8° to 18° C. divided by the total weight of the artificial bed blocks.

Table 2 indicates that the artificial bed blocks obtained by the methods of the embodiments can reduce the ratio of comtamination by weed fungi, yet can improve appearing ratio of fruit body of "Shiitake" mushroom.

By the example for comparison 1 based on the 2nd method of the conventional cultivation of artificial bed blocks (Japanese Patent Publication No. 56-99726) stated in the beginning, on the other hand, the rate of contamination by weed fungi of the obtained artificial bed blocks is outstandingly high because water is sprinkled directly over the lumps of mycelium without forming hard layer on the surface during culturing process.

By the example for comparison 2 based on the 1st method of the conventional cultivation of artificial bed blocks, the ratio of contamination by weed fungi is lower than that of the example for comparison 1 as the lumps of mycelium are cultured in a polypropylene bag. However, the rate of fruit body of mushroom appearance on the artificial bed blocks is very low, which suggests a problem for practical application.

placing the medium in a container of impermeable material and watering the medium to a sufficient moisture content, sterilizing the container with the medium and inoculating the medium;

incubating the contents of the container to allow the mycelium to run, the incubating being at a preselected temperature and for a period sufficient to allow the mycelium to unite the medium into a bed block;

removing the bed block from the container and placing the bed block in a space substantially closed from the environment and providing means in the closed space to assure a relative humidity of at least 90 percent for a period sufficient to allow a new layer of aerial hypha to form on the bed block;

exposing the bed block to open air and sprinkling the bed block to maintain the temperature thereof with a liquid consisting essentially of water for a period sufficient to cause the aerial hypha to attain a mature coloration; and inducing the bed block so formed to bear mushrooms.

2. A process for preparing artificial bed blocks according to claim 1, wherein the closed space is formed by enclosing a space with plastic sheets.

3. A process for preparing artificial bed blocks as set forth in claim 2, wherein the closed space formed by plastic sheets is set to a volume of 2 to 10 times larger than the volume of the lumps of mycelium kept in said closed space.

4. A process for preparing artificial bed blocks in accordance with claim 1 or claim 2 in which a temperature in the closed space is set at 15° to 28° C. and the lumps of mycelium are cultured under the said temperature condition for 3 to 10 days.

5. A process for preparing artificial bed blocks as defined by claim 1, wherein the closed space is formed

TABLE 2

| | Culturing process | | | Watering process | | | | Contamination by weed fungi (%) | Yield ratio (%) |
|---|---|---|---|---|---|---|---|---|---|
| | Time | Temperature (°C.) | Lumps of mycelium | Content | Time | Temperature (°C.) | Quantity | | |
| Embodiment | | | | | | | | | |
| 1 | 5 days | 20~25 | Cotton-like, fluffy new and hard layer of hypha is formed on the whole surface and excess water is secreted. | City water | 10 days | 20~25 | Continuous sprinkling | 0 | 42 |
| 2 | 2 days | 15~22 | Cotton-like, fluffy new layer of hypha is slightly formed on the surface. Not much water is secreted. | City water | 10 days | 20~25 | Continuous sprinkling | 16.5 | 25 |
| 3 | 5 days | 20~25 | Same as embodiment 1 | City water | 10 days | 20~25 | Intermittent every 8 hours | 6.6 | 38 |
| 4 | 5 days | 20~25 | Same as embodiment 1 | Solution of antimicrobial | 10 days | 20~25 | Continuous sprinkling | 0 | 46 |
| 5 | 5 days | 20~25 | Same as embodiment 1 | pH control | 10 days | 20~25 | Continuous sprinkling | 0 | 43 |
| 6 | 5 days | 20~25 | Same as embodiment 1 | Nutritious substance* | 10 days | 20~25 | Continuous sprinkling | 3.3 | 45 |
| 7 | 5 days | 20~25 | Same as embodiment 1 | Mixture of antimicrobial, pH controller and nutritious substances | 10 days | 20~25 | Continuous sprinkling | 0 | 52 |
| Comparison | | | | | | | | | |
| 1 | Not practiced | | Defects on surface when taken out of a container. | City water | 10 days | 20~25 | Continuous sprinkling | 26.4 | 19 |
| 2 | 7 days | 20~25 | Same as embodiment 1 | — | | | Not practiced | 69.3 | 5 |

*City water and water dissolved with substances are used intermittently

We claim:

1. In a synthetic system for the culture of forest mushrooms with the formation of bed blocks of a medium which includes at least a major portion of sawdust and a minor portion of at least one selected grain bran, a process for assuring substantially complete infection of the medium by mycelium and the development of a uniform, concentrated layer of mature aerial hypha on the surface of the bed blocks, the process including the steps of:

by a closed house provided with a humidifier and an air-conditioner.

6. A process for preparing artificial bed blocks according to claim 4, in which a container filled with water is kept in the closed space to increase humidity in said closed space if the moisture content of the lumps of mycelium placed in said closed space is less than 50 wt %.

7. A process for preparing artificial bed blocks defined in claim 1, in which water sprinkling in the closed space is continued for more than 7 days while keeping temperature of the lumps of mycelium at 15° to 28° C.

8. A process for preparing artificial bed blocks according to claim 1, in which the water used for sprinkling contains solution of at least any one of antimicrobial substance, hydrogen ion concentration control substance, and nutritious substance to "*L. edodes*".

* * * * *